Oct. 8, 1968     L. W. LERCH     3,404,637
TROLLEY CHOKE
Filed Nov. 26, 1965     2 Sheets-Sheet 1
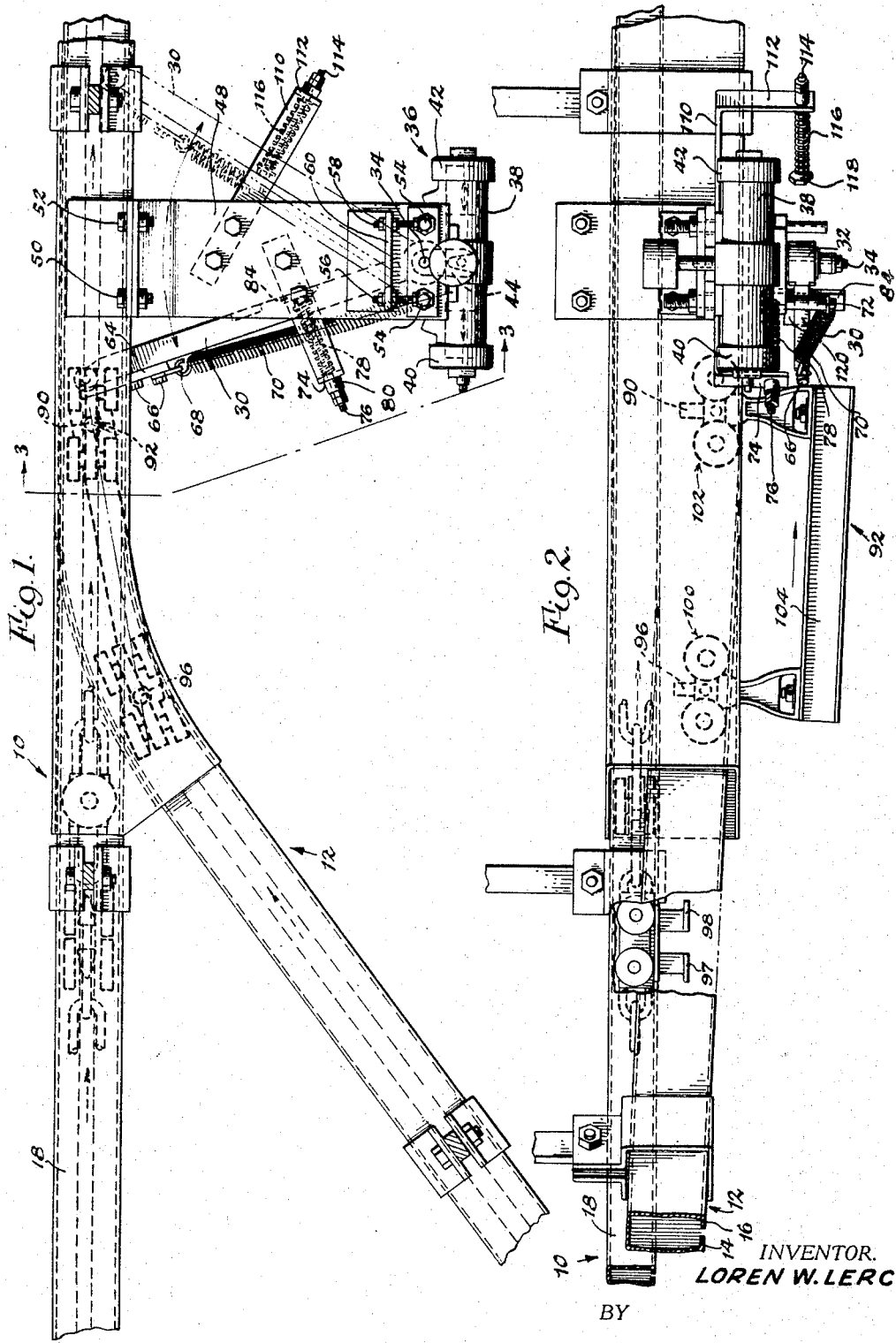
INVENTOR.
LOREN W. LERCH
BY
Bean, Brooke, Buckley + Bean
ATTORNEYS

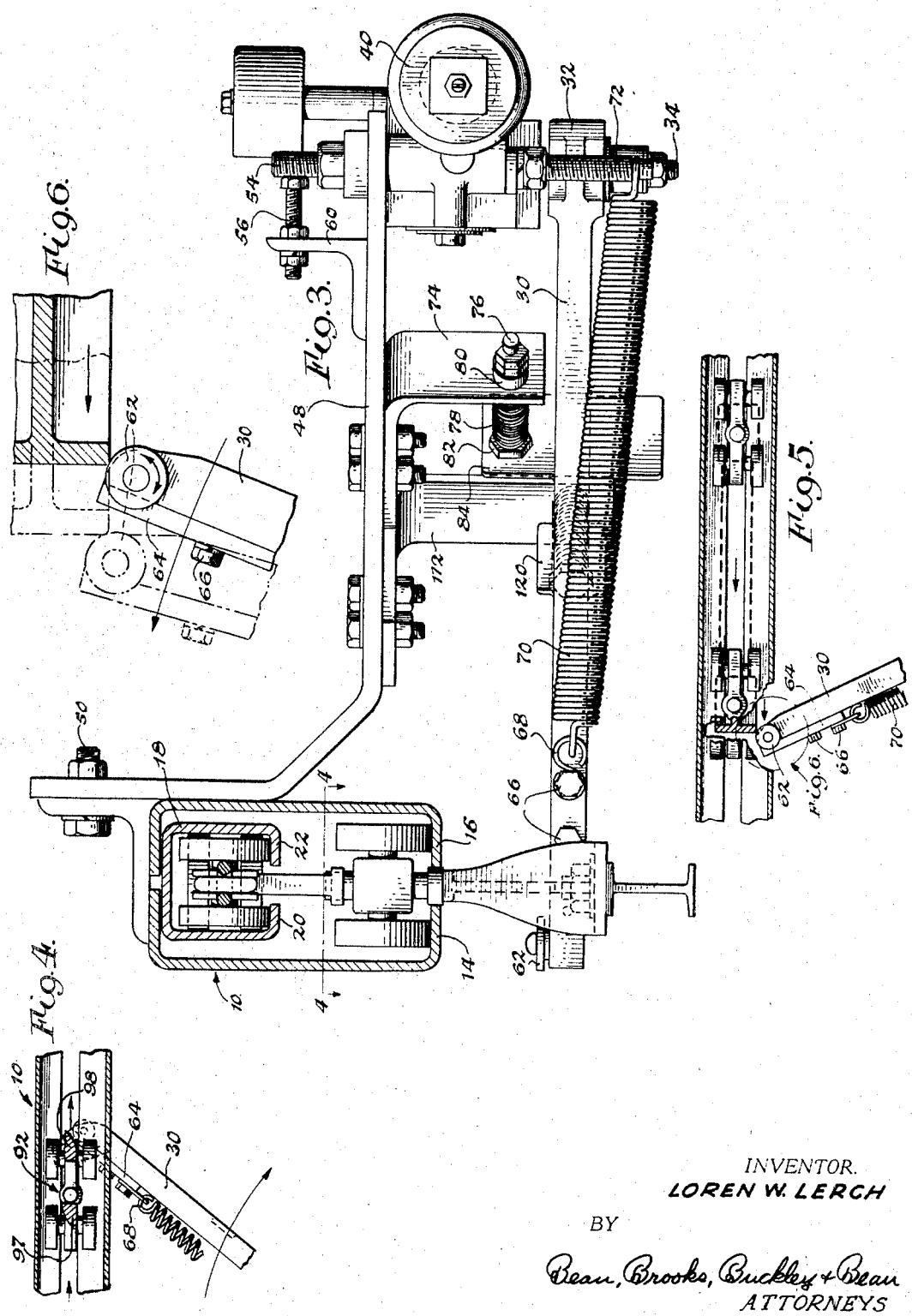

United States Patent Office 3,404,637
Patented Oct. 8, 1968

3,404,637
TROLLEY CHOKE
Loren W. Lerch, 124 Wakefield Ave.,
Buffalo, N.Y. 14214
Filed Nov. 26, 1965, Ser. No. 509,789
3 Claims. (Cl. 104—96)

ABSTRACT OF THE DISCLOSURE

A device for retarding and stopping movement of a free travelling load trolley in which an arm is mounted for arcuate movement in the path of the trolley between first and second points. The arm is normally urged to its first point position by a spring and the spring plus a hydraulic damping unit resist movement of the arm from the first to the second point positions. Yieldable abutments are provided, one of which locates the arm normally at its first point position and the other of which engages the arm in close adjacency to and as the arm approaches its second point position.

---

This invention relates to overhead conveyor systems and pertains, more particularly, to an improved form of check device therefor in which trolleys progressing along a sudsidiary track which joins a main power track are checked and stopped in proper position within the course defined by the main power track for subsequent engagement by the main track powering device.

It is of primary concern in connection with this invention to provide an improved check device as set forth generally above, which is readily installed and adjusted for disposition of the incoming trolleys in proper relationship relative to the powering device; the check device being characterized by its ability to effect a checking force which is proportional to the speed of the incoming trolley.

More particularly, it is an object of this invention to provide an improved form of check device for overhead conveyor system adapted to be disposed adjacent the juncture between a subsidiary trolley track portion and a main trolley track portion wherein viscous damping means is utilized to check and slow the motion of an incoming trolley, which viscous damping means is supplemented by a spring device serving to effect positive stopping action. The viscous damping device exerts a checking force proportional to the speed of the incoming trolley and is thus capable of proper operation under a wide range of operating conditions. The net effect is that, regardless of the incoming speed, the trolley will be travelling very slowly near the end of the travel of the device. At this point, the spring check portion dominates the checking action of the viscous damping device (the aforesaid very slow speed of the trolley commands very little restricting action from the viscous damping device) and thereby stops all trolleys within the confines of the main track course.

Certain aspects of this invention are involved with the provision of means whereby reverse motion of the power chain allows trolleys under power to be passed in reverse direction by the check means.

Other objects and advantages of the present invention will appear from the specification hereinafter, and the accompanying drawing wherein:

FIG. 1 is a top plan view showing a main trolley track portion and an intersecting subsidiary trolley track portion and illustrating the check device according to the present invention associated therewith;

FIG. 2 is a horizontal view of the assembly shown in FIGURE 1;

FIG. 3 is an enlarged transverse sectional view taken substantially along the plane of section line 3—3 in FIGURE 1 showing certain details of the check mechanism and also illustrating the power chain device and a load trolley associated therewith;

FIG. 4 is a horizontal sectional view taken substantially along the plane of section line 4—4 illustrating the manner in which the subsidiary trolleys are picked up after having been positioned properly by the check device;

FIG. 5 is a longitudinal section taken horizontally along the main trolley rail illustrating the manner in which reverse direction passage of trolleys is permitted by the check device; and FIG. 6 is an enlarged sectional view as indicated in FIGURE 5.

With reference to FIGURE 1, a main trolley track portion is indicated generally by reference character 10 and a subsidiary trolley track portion is indicated generally by the reference character 12. The main track portion may be constructed in any desired manner such as is indicated for example in FIGURE 3. In FIGURE 3, the main track portion will be seen to include a framework presenting the load trolley rails 14, 16 and, associated therewith, a power chain rail assembly 18 providing the power chain rail portions 20 and 22. The subsidiary trolley track portion 12, on the other hand, includes only the load trolley track portion of the frame as indicated perhaps best in FIGURE 2 which illustrates only the presence of the rails 14 and 16 and it is to be further understood that the subsidiary trolley track portion 12 may be provided with a downward inclination toward the main track portion 10 so that trolleys are travelled by gravity therealong to intersect and merge with the main track assembly 10. Other means may of course be provided for feeding the trolleys onto the main track. Regardless of the manner of construction, a trolley passing along the track portion 12 will merge smoothly with the trolley rail portion of the main track 10 and, in so doing, will engage against the check arm assembly 30 shown in FIGURE 1.

The check arm 30 is provided with a boss 32 at one end, see particularly FIGURE 3, which is affixed to a shaft 34, rotation of which is opposed by the viscous damping assembly indicated generally by the reference character 36.

The specific details of the viscous or hydraulic damping assembly form no part of the present invention but one form may be as indicated which includes a cylinder 38 having end cap members 40 and 42 and provided with a piston, not shown, sliding within the cylinder 38 between the end caps 40 and 42 and which may be moved by a suitable connecting rod 44 rigid with the shaft 34 to which the arm 30 is attached. Thus, as the shaft 34 is rotated, the piston moves within the cylinder 38 and the usual viscous damping fluid and valving devices are utilized to oppose movement of the piston in proportion to the speed at which the piston is tended to be moved, all as is well understood in the hydraulic damping art. Because of this characteristic of the hydraulic damping device, a trolley entering the main track and first encountering the arm 30, as is shown in FIGURE 1, will evoke a restraining force response from the hydraulic damping assembly which is of a magnitude proportional to trolley speed. Thus, a trolley entering at high speed will be subjected to greater deceleration than will a trolley entering at slow speed. As a result, both trolleys will be travelling at approximately the same slow rate when the arm 30 has reached the end of its travel. Consequently, in either case, the hydraulic damping assembly will be exerting very little restraining force near the end of travel of the arm 30. It will be understood, of course, that the damping device exhibits very little, if any, resistance to return motion of the arm 30.

The damping assembly 36 is mounted to the underside of a bracket arm 48 which is secured as by fasteners 50 to a suitable mounting bracket 52 fixed to the main frame 10. The fasteners 54 which mount the assembly 36 to the plate 48 preferably pass through enlarged openings in the member 48 so that the cylinder assembly 36 may be adjusted both toward and away from the main track 10 and pivotaly with relation thereto, the purpose of which will be presently apparent. When the proper adjustment is effected, stop screw elements 56 and 58 carried by the upstanding leg portion 60 of an L-shaped bracket fixed to the member 48 serve to fix the position of adjustment of the assembly 36.

The arm 30 is provided at its outer or free end with a roller 62, see particularly FIGURE 6, but this roller is not normally engaged by a load trolley unless the direction of movement of the power chain assembly is reversed. Instead, the trolleys passing along the track section 12 are engaged by a wear plate member 64, see FIGURE 6, which is secured to the arm 30 as by fasteners 66. One of these fasteners serves to anchor a spring attachment bracket 68 to one end of which a tension spring 70 is affixed, see particularly FIGURE 1. The opposite end of the tension spring 70 is attached to a suitable anchor bolt 72 as can be best seen in FIGURE 3. The purpose of the tension spring 70 is to normally position the arm as shown in FIGURE 1, and it also functions to supplement the action of the hydraulic damping assembly progressively from this position to the end of the travel of the arm 30.

The underside of the arm 48 carries a bracket having a depending leg portion 74 which mounts an adjustable stop screw 76 which passes freely through the leg 74 but is normally biased under the action of the compression spring 78 to seat the washer 80 against the leg 74.

The headed free end 82 of the stop bolt 76 forms both a seat for the compression spring 78 and an abutment surface against which the abutment plate 84 fixed to the arm 30 is adapted to engage to thus position the arm 30, angularly, so as to position its free end, and the wear or impact plate 64 properly with relation to a trolley coming along the track section 12. To this end, it will be appreciated that the head 82 contacts the abutment plate 84 to counteract the action of the tension spring 70 and dispose the arm 30 in such position as is shown in FIGURE 1. A conventional type of load trolley 92 is shown in FIGURES 1 and 2 just as it enters the main line from the subsidiary line, at which point it engages the arm 30 so as to be checked and positioned for engagement by the power chain assembly. The load trolley 92 may include one or more drive pins such as those indicated by reference characters 90 and 96 and, as is conventional, the power chain assembly includes depending dogs 97 and 98 which are adapted to hold a drive pin captive therebetween. For this purpose, as is conventional, the lead dog 98 is cammed aside by the drive pin as it engages the same and then swings back to its normal vertical position so that the drive pin is captive between the two dogs 96 and 98. As is also conventional, the dogs 96 and 98 are pivoted for lateral movement whenever the nose or leading edge portion of the front dog engages the drive pin and is cammed aside thereby. Likewise, each load trolley may be of conventional construction and will be seen to include wheeled carriages indicated generally by the reference characters 100 and 102, see particularly FIGURE 2, interconnected by a body portion 104, the aforesaid carriages 100 and 102 being located in the regions of the pins 90 and 96.

A further bracket 110 having a depending leg portion 112, see particularly FIGURE 2, carries a further stop bolt 114 which has a compression spring 116 associated therewith and which is provided with a headed end 118, identically as was described in conjunction with the stop pin 76. The stop pin 114 is adapted to have its head 118 engaged in an abutment plate 120 on the arm 30 when the arm 30 is at the end of its check motion travel. In this manner, the motion of an incoming trolley, as the arm 30 near the end of its travel, is terminally resisted and overcome almost solely by the spring 70 and almost negligibly by the hydraulic damping device. The hydraulic damping device offers little terminal resistance because the terminal end speed of the trolley is very low. At the end of normal travel of the arm 30, the spring 116 provides an essentially positive stop for the incoming trolley but, at the same time, allows sufficient further travel of the arm 30 to pass the trolley when the main track drive mechanism engages the trolley and moves it along the main track.

It will be appreciated, then, that the hydraulic damping device allows the mechanisms to accommodate for a wide range of incoming trolley speeds since the hydraulic damping mechanism exerts a restraining force which is proportional to the rate at which the arm 30 is moved. Thus, any incoming trolley will be slowed to a rather fixed, controlled low speed near the end of the travel of the arm 30 which, due to the speed responsive nature of the hydraulic damping mechanism, will evoke little resistance to the terminal motion of the trolley. The spring 70, however, will now dominate the checking motion so that each incoming trolley, regardless of its initial speed, will be stopped and positioned substantially at the same place within the confines of the course defined by the main track.

In installing the mechanism, it is a simple matter to loosen the nuts associated with the mounting bolts 54 of the damping mechanism 36 and permit of the angular adjustment of the arm 30 and of the abutment member 76 so as to assure the aforesaid proper positioning of each incoming trolley. When this adjustment is properly obtained, the nuts on the bolts 54 are tightened and the stop screws 56 and 58 are engaged against the members 54 as is shown in FIGURE 1 to hold the adjusted position of the assemblage.

Should the direction of motion of the power chain be reversed, for any reason, the stop pin 76 and its associated abutment plate 74 will permit of such movement as is illustrated in FIGURES 5 and 6 by allowing the trolley to engage against the aforementioned roller 62 which enhances the ease with which this reverse motion is effected and will allow the arm 30 to swing aside and let the trolleys pass.

Thus, it will be appreciated that although only one form of the invention has been illustrated and described in detail, various changes may be made therein without departing from the spirit of the invention or the scope of the following claims.

I claim:
1. In combination with a main trolley rail extending along a given course and having an overhead power chain provided with pusher dogs for moving load trolleys along said course,
   an incoming trolley rail merging smoothly with and joining said main rail,
   a load trolley engaged in said incoming trolley rail and provided with a drive pin for engagement by said pusher dogs,
   and a yieldable stop device for checking the movement of said load trolley within said course to position said drive pin at a substantially fixed predetermined position within said course, said stop device including an arm pivotally mounted at one end remote from said course and having an opposite free end normally positioned adjacent said juncture between said main and free rails, and movable therefrom along said course to a terminal position clearing said course, a spring for urging said arm to the normal position thereof against the direction of movement of trolleys travelling along said incoming rail, a yieldable abutment for said arm opposing said spring at the normal position of said arm, and viscous damping means opposing movement of said arm away from said normal position thereof.

2. In combination with a main trolley rail extending along a given course and having an overhead power chain provided with spaced, depending dogs for moving load trolleys along said course.
  a free trolley rail merging smoothly with and joining said main trolley rail,
  a load trolley engaged in said free trolley rail and provided with a drive pin for engagement by said pusher dogs,
  and a yieldable stop device for checking the movement of said trolley along said free rail to position said trolley within the confines of said course so that said drive pin is located substantially at a predetermined position within said course, said stop device including an arm pivotally mounted at one end remote from said course and having an opposite free end for checking and stopping the load trolley, said arm being of a length to position said free end thereof within the path of movement of a trolley proceeding along said course during a predetermined arc of pivoted movement of said arm, commencing with a first point whereat said free end of the arm is adjacent the juncture between said main and free rails and terminating at a second point whereat the free end of the arm is remote from such juncture, viscous damping means resisting movement of said arm from said first to said second points, a spring normally urging said arm toward said first point, and yieldable abutment means opposing movement of said arm only in close adjacency to and as said free end of the arm approaches said second point.

3. In combination with a main trolley rail extending along a given course and having an overhead power chain provided with spaced, depending dogs for moving load trolleys along said course,
  a free trolley rail merging smoothly with and joining said main trolley rail,
  a load trolley including an elongate body provided with wheeled carriages at its front and rear ends and having an upstanding drive pin for engagement by said pusher dogs,
  and a yieldable stop device for checking the movement of said trolley along said free rail to position said trolley within the confines of said course so that said drive pin is located substantially at a predetermined position within said course, said stop device including a mounting bracket connected to and projecting laterally from said main trolley rail, a hydraulic damper carried by said mounting bracket and having a vertical actuating shaft, an arm fixed to said actuating shaft and projecting therefrom toward said free rail, said arm being of a length to be within the path of movement of a trolley proceeding along said course during a predetermined arc of pivoted movement of said arm with said actuating shaft, commencing with a first point adjacent the juncture between said main and free rails and terminating at a second point remote from such juncture, a spring normally urging said arm toward said first point, a yieldable abutment opposing said spring and normally maintaining said arm at said first point, and a second yieldable abutment opposing movement of said arm only in close adjacency to and as said arm approaches said second point.

References Cited

UNITED STATES PATENTS

| | | | |
|---|---|---|---|
| 1,690,695 | 11/1928 | Norton | 104—256 |
| 3,085,659 | 4/1963 | Ashmead | 104—250 X |

ARTHUR L. LA POINT, *Primary Examiner.*

J. E. BABER, D. F. WORTH, *Assistant Examiners.*